(12) United States Patent
Kito et al.

(10) Patent No.: US 10,352,454 B2
(45) Date of Patent: Jul. 16, 2019

(54) MECHANICAL SEAL DEVICE

(71) Applicants: EAGLE INDUSTRY CO., LTD., Minato-ku, Tokyo (JP); EAGLEBURGMANN JAPAN CO., LTD., Minato-ku, Tokyo (JP)

(72) Inventors: Masakazu Kito, Tokyo (JP); Hiroshi Tanaka, Tokyo (JP)

(73) Assignees: EAGLE INDUSTRY CO., LTD. (JP); EAGLEBURGMANN JAPAN CO., LTD. (JP)

( * ) Notice: Subject to any disclaimer, the term of this patent is extended or adjusted under 35 U.S.C. 154(b) by 0 days.

(21) Appl. No.: 15/521,609

(22) PCT Filed: Oct. 27, 2015

(86) PCT No.: PCT/JP2015/080218
§ 371 (c)(1),
(2) Date: Apr. 24, 2017

(87) PCT Pub. No.: WO2016/072317
PCT Pub. Date: May 12, 2016

(65) Prior Publication Data
US 2017/0248235 A1 Aug. 31, 2017

(30) Foreign Application Priority Data
Nov. 4, 2014 (JP) .................................. 2014-224146

(51) Int. Cl.
*F16J 15/34* (2006.01)

(52) U.S. Cl.
CPC ........... *F16J 15/34* (2013.01); *F16J 15/3404* (2013.01); *F16J 15/3464* (2013.01); *F16J 15/3484* (2013.01)

(58) Field of Classification Search
CPC ...... F16J 15/34; F16J 15/3404; F16J 15/3464; F16J 15/3484; F16J 15/442
See application file for complete search history.

(56) References Cited

U.S. PATENT DOCUMENTS

| 3,743,302 A | 7/1973 | Bach et al. ..................... 277/10 |
| 3,746,349 A * | 7/1973 | Smale .................. F16J 15/3404 277/382 |

(Continued)

FOREIGN PATENT DOCUMENTS

| CN | 2204358 | 8/1995 | ............... F16J 15/54 |
| CN | 101313163 A | 11/2008 | |

(Continued)

OTHER PUBLICATIONS

Notification of Transmittal of Translation of the International Preliminary Report on Patentability (PCT/IB/338) dated May 18, 2017, with International Preliminary Report on Patentability (PCT/IB/373) and Written Opinion of the International Searching Authority (PCT/ISA/237), for corresponding international application PCT/JP2015/080218.

(Continued)

*Primary Examiner* — Eugene G Byrd
(74) *Attorney, Agent, or Firm* — Hayes Soloway P.C.

(57) ABSTRACT

In an embodiment, a mechanical seal device has a mating ring (131) that rotates with a rotating shaft (101), as well as an opposing seal ring (133) that slidably contacts the mating ring (131), so as to seal between the rotating shaft (101) and a seal cover (105) fixed to an equipment main body (102); wherein the seal cover (105) is a split structure comprising at least a first seal cover (107, 108) and second seal cover (106), the first seal cover (107, 108) is detachably connected in the axial direction by leaving the second seal cover (106)

(Continued)

free from it, and the seal ring (133) is connected to the first seal cover (107, 108) in a securely following manner.

4 Claims, 3 Drawing Sheets

(56) References Cited

U.S. PATENT DOCUMENTS

| | | | |
|---|---|---|---|
| 4,509,762 A | 4/1985 | Garrett | 277/372 |
| 5,067,733 A | 11/1991 | Nagai | 277/370 |
| 5,114,160 A | 5/1992 | Ootsuka | 277/408 |
| 5,658,127 A * | 8/1997 | Bond | F01D 25/183 |
| | | | 277/399 |
| 5,722,671 A * | 3/1998 | Nosowicz | F16J 15/3404 |
| | | | 277/408 |
| 6,224,061 B1 | 5/2001 | Roddis | 277/361 |
| 6,325,382 B1 * | 12/2001 | Iwamoto | F16J 15/3404 |
| | | | 277/368 |
| 8,011,668 B2 | 9/2011 | Roddis | 277/408 |
| 8,800,995 B2 | 8/2014 | Suefuji | F16J 15/342 |
| 9,581,247 B2 | 2/2017 | Takigahira et al. | |
| | | | F16J 15/3404 |
| 9,845,888 B2 | 12/2017 | Furukawa | |
| 2001/0045701 A1* | 11/2001 | Toal | F16J 15/3404 |
| | | | 277/370 |
| 2002/0047239 A1 | 4/2002 | Auber | 277/358 |
| 2003/0042683 A1* | 3/2003 | Takahashi | F16J 15/3404 |
| | | | 277/370 |
| 2004/0173971 A1* | 9/2004 | Kudari | F16J 15/3404 |
| | | | 277/361 |
| 2004/0212154 A1* | 10/2004 | Yada | B01J 4/001 |
| | | | 277/512 |
| 2006/0263207 A1 | 11/2006 | Manninen | 415/170.1 |
| 2009/0085300 A1* | 4/2009 | Takahashi | F16J 15/3404 |
| | | | 277/391 |
| 2009/0174149 A1 | 7/2009 | Takahashi | 277/370 |
| 2009/0200749 A1* | 8/2009 | Teshima | F16J 15/3404 |
| | | | 277/512 |
| 2009/0302546 A1* | 12/2009 | Takahashi | F16J 15/3404 |
| | | | 277/408 |
| 2010/0032907 A1* | 2/2010 | Anderberg | F16J 15/3404 |
| | | | 277/306 |
| 2010/0308543 A1 | 12/2010 | Huang | 277/511 |
| 2011/0175297 A1 | 7/2011 | Fesl | 277/358 |
| 2011/0198813 A1* | 8/2011 | Takahashi | F04D 29/122 |
| | | | 277/387 |
| 2012/0013076 A1 | 1/2012 | Takahashi | 277/391 |
| 2012/0013077 A1 | 1/2012 | Takahashi | |
| 2012/0099984 A1 | 4/2012 | Abarca Melo | 415/229 |
| 2012/0187636 A1* | 7/2012 | Suefuji | F16J 15/3484 |
| | | | 277/387 |
| 2012/0201673 A1* | 8/2012 | Aoike | F16J 15/3404 |
| | | | 415/229 |
| 2012/0267860 A1 | 10/2012 | Sato | 277/358 |
| 2013/0223782 A1* | 8/2013 | Mandou | F16J 15/3464 |
| | | | 384/481 |

FOREIGN PATENT DOCUMENTS

| | | | |
|---|---|---|---|
| CN | 102405365 A | 4/2012 | |
| CN | 102518814 | 6/2012 | F16J 15/52 |
| CN | 202301963 | 7/2012 | F16J 15/34 |
| CN | 103392087 | 11/2013 | F16J 15/34 |
| CN | 103574039 | 2/2014 | F16J 15/34 |
| CN | 103821942 A | 5/2014 | |
| CN | 203770641 | 8/2014 | B02C 17/18 |
| DE | 102007002644 A1 | 7/2008 | |
| GB | 2351536 A | 1/2001 | |
| JP | S52156858 U | 11/1977 | |
| JP | H0659668 U | 8/1994 | |
| JP | 2003074713 A | 3/2003 | |
| WO | 2010116844 A1 | 10/2010 | |

OTHER PUBLICATIONS

International Search Report (ISR), dated Dec. 8, 2015, issued for International application No. PCT/JP2015/080218.
A First Office Action issued by the State Intellectual Property Office of China dated Dec. 29, 2017 for Chinese counterpart application No. 201580058572.8.
Chinese Office Action (w/translation) issued in application No. 201580058486.7, dated Dec. 29, 2017 (9 pgs).
Notification of Transmittal of translation of the International Preliminary Report on Patentability dated May 18, 2017 and Written Opinion for related International Patent Application Serial No. PCT/JP2015/080219.
International Search Report (ISR), dated Dec. 8, 2015, issued for International Patent Application Serial No. PCT/JP2015/080219.
U.S. Appl. No. 15/521,610, filed Apr. 24, 2017, Kito et al.
Chinese Office Action issued in application No. 201580058486.7, dated Sep. 21, 2018 (9 pgs).
Chinese Office Action issued in application No. 201580058572.8, dated Sep. 18, 2018 (11 pgs).
Chinese Office Action (w/translation) issued in application No. 201580058572.8, dated Apr. 3, 2019 (12 pgs).

* cited by examiner

[FIG. 1]
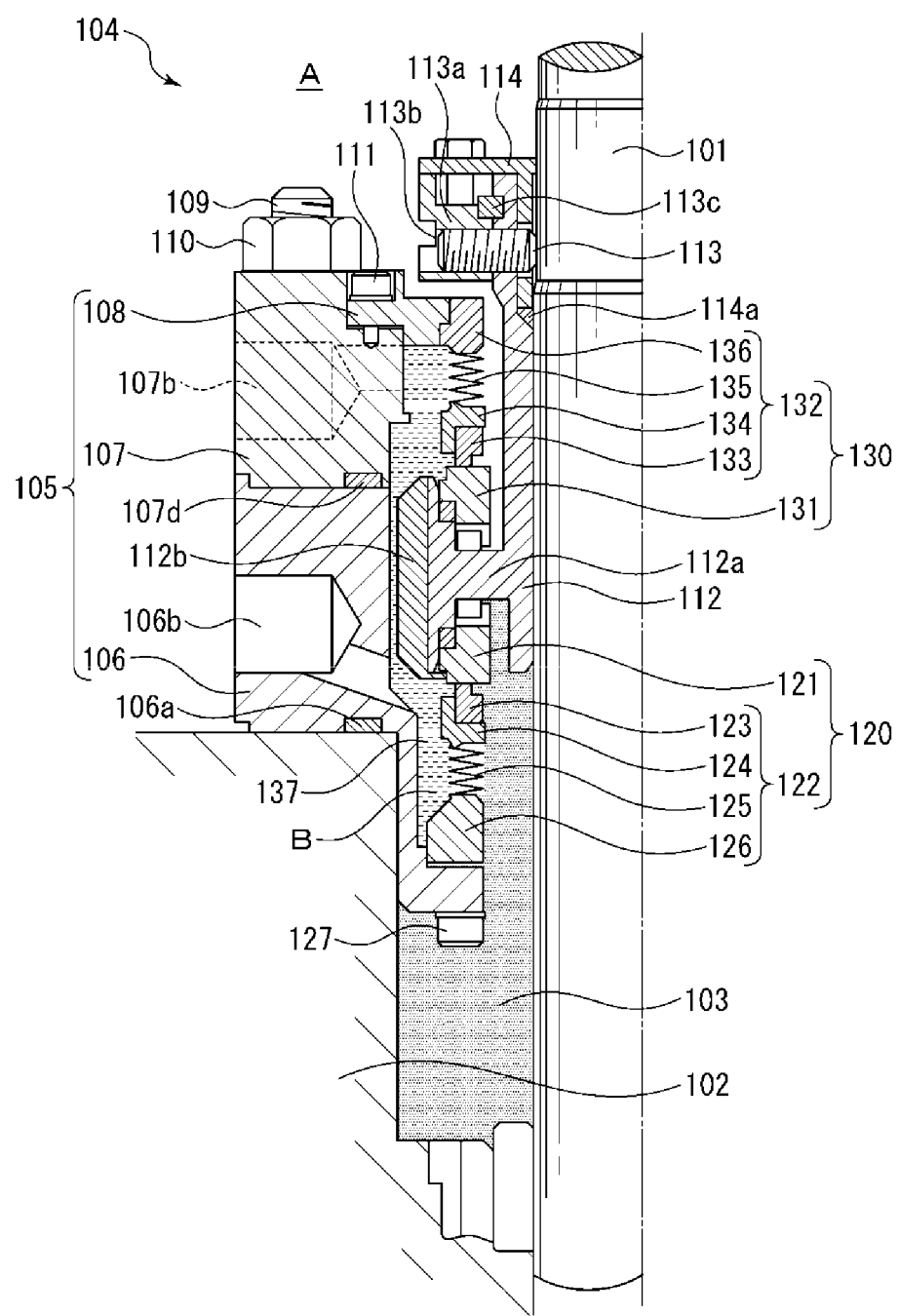

[FIG. 2]
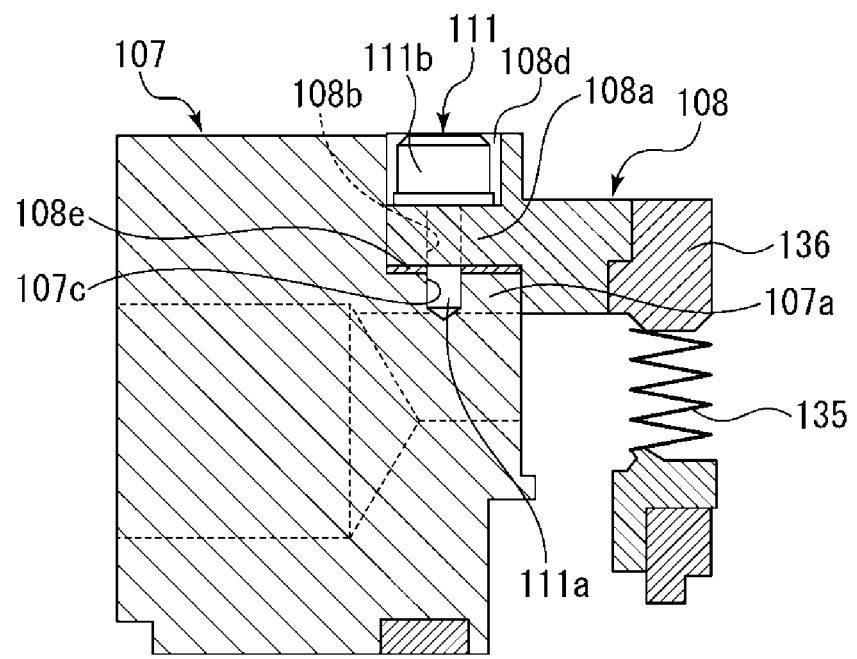

[FIG. 3]
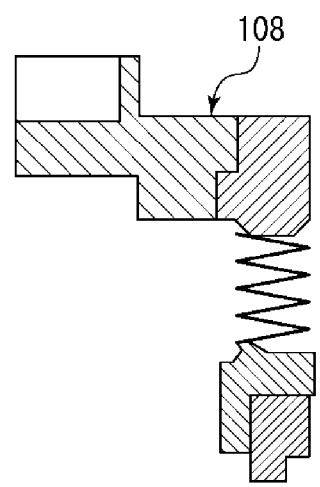

MECHANICAL SEAL DEVICE

This application is the U.S. National Phase under 35 U.S.C. § 371 of International Application PCT/JP2015/080218, filed Oct. 27, 2015, which claims priority to Japanese Patent Application No. 2014-224146, filed Nov. 4, 2014. The International Application was published under PCT Article 21(2) in a language other than English.

TECHNICAL FIELD

The present invention relates to a mechanical seal device used as an axial seal for rotating equipment in chemical, food, general industry, and other applications.

BACKGROUND ART

A traditional bellows-type mechanical seal device has a seal ring held on a retainer which is fixed to a bellows, and an opposing mating ring that slidably contacts the seal ring, wherein the seal ring is supported on a seal cover via the retainer, bellows, and an adapter, and the mating ring is supported on a rotating shaft and rotates with the rotating shaft (refer to Patent Literature 1, for example).

BACKGROUND ART LITERATURE

Patent Literature

Patent Literature 1: International Patent Laid-open No. 2010/116844 (Paragraph 0016, FIG. 1)

SUMMARY OF THE INVENTION

Problems to be Solved by the Invention

With the mechanical seal device described in Patent Literature 1, the retainer, bellows, adapter, and seal cover constituting the fixed-side seal assembly are fixed to each other by means of welding, etc. Also, the seal cover is fixed to an equipment main body via bolts and nuts. When correcting the sliding contact surface of the seal ring or performing other maintenance, therefore, the bolts and nuts fixing the seal cover to the equipment main body must be unfastened and the fixed-side seal assembly must be removed in the axial direction together with the seal cover before the maintenance can be performed.

However, the seal cover removed at the time of maintenance is structured in such a way that it covers the seal ring or other seal element in the radial direction and axial direction of the rotating shaft and is therefore considerably large in the radial direction and axial direction and heavy, which gives rise to the problem of difficulty handling the seal ring, etc., during maintenance as it is connected to the seal cover via the bellows, etc. This problem is particularly noticeable with mechanical seal devices used for large equipment.

The present invention was conceived from recognizing this problem, and its object is to provide a mechanical seal device with improved seal cover structure that achieves excellent ease of handling the seal ring or other seal element during maintenance.

To achieve the aforementioned object, the mechanical seal device proposed by the present invention has:

a mating ring that rotates with a rotating shaft, as well as an opposing seal ring that slidably contacts the mating ring, so as to seal between the rotating shaft and a seal cover fixed to an equipment main body;

wherein such mechanical seal device is characterized in that the seal cover is a split structure comprising at least a first seal cover and a second seal cover, the first seal cover is detachably connected in the axial direction by leaving the second seal cover free from it, and the seal ring is connected to the first seal cover in a securely following manner.

According to this characteristic, the seal ring is connected to the first seal cover in a securely following manner, and the first seal cover is detachably connected in the axial direction by leaving the second seal cover free from it, so by removing the seal ring from the second seal cover together with the first seal cover, maintenance of the seal ring, etc., can be performed on the connection piece which is lightweight and offers excellent ease of handling.

Another characteristic is that the first seal cover is a split structure comprising an outer-diameter-side seal cover and an inner-diameter-side seal cover, both connected detachably, the seal ring is connected to the inner-diameter-side seal cover in a securely following manner, and a feed hole is provided in the outer-diameter-side seal cover and also in the second seal cover for feeding fluid from the outside into the space where the seal ring is placed.

According to this characteristic, there is no need to form a feed hole in the inner-diameter-side seal cover, which allows for forming the inner-diameter-side seal cover small and lightweight and thereby improving the ease of handling the seal cover during maintenance.

Another characteristic is that the first seal cover is a split structure comprising an outer-diameter-side seal cover and an inner-diameter-side seal cover, the inner-diameter-side seal cover is detachably connected to the outer-diameter-side seal cover from the outer side in the axial direction, and the seal ring is connected to the inner-diameter-side seal cover in a securely following manner.

According to this characteristic, the inner-diameter-side seal cover to which the seal ring is connected can be removed from the outer-diameter-side seal cover without removing the outer-diameter-side seal cover.

BRIEF DESCRIPTION OF THE DRAWINGS

FIG. 1 Section view of the mechanical seal device in Example 1.

FIG. 2 Section view of the mechanical seal device in FIG. 1, showing a state where the first seal cover (outer-diameter-side and inner-diameter-side seal covers) has been removed.

FIG. 3 Section view of the outer-diameter-side seal cover in FIG. 2, showing a state where the inner-diameter-side seal cover has been removed.

MODE FOR CARRYING OUT THE INVENTION

Modes for carrying out a mechanical seal device pertaining to the present invention are explained below based on examples.

Example 1

The mechanical seal device pertaining to Example 1 is explained by referring to FIGS. 1 to 3. In the explanations below, the relative directional terms such as "top" and "bottom" refer to those defined in the drawings of FIGS. 1 to 3 and do not necessarily represent the top and bottom of the mechanical seal device after being installed, while the terms "inner side" and "outer side" refer to the sealed fluid side and atmosphere side of the mechanical seal device, respectively.

A mechanical seal device 104 is of the so-called back-to-back double type, where a primary-side mechanical seal 120 and secondary-side mechanical seal 130 are used to axially seal between a rotating shaft 101 extending in the vertical direction and a seal cover 105 enclosing the rotating shaft 101. A pump impeller housed in an equipment main body 102 is fixed to the bottom of the rotating shaft 101. The seal cover 105 is fixed to the equipment main body 102 by a bolt 109 and nut 110 and encloses the rotating shaft 101 in the axial direction and radial direction. It should be noted that the space which is formed by the rotating shaft 101 and seal cover 105 and in which the primary-side mechanical seal 120 and secondary-side mechanical seal 130 are placed, is called the "space where the seal ring is placed."

The seal cover 105 is formed by an axial-direction seal cover 106 (second seal cover) which is fixed to the equipment main body 102 with the bolt 109 and nut 110 via a gasket 106a, and an outer-diameter-side seal cover 107 (first seal cover) and inner-diameter-side seal cover 108 (first seal cover) which are connected to the end of the axial-direction seal cover 106 and seal in the radial direction. These seal covers 106, 107, 108 are each formed as a detachable split structure by stainless steel, aluminum alloy or other metal.

As shown in FIG. 2, the outer-diameter-side seal cover 107 has a circular cutout at the top on the inner diameter side (end face side on the atmosphere A side), and also has a circular projection 107a formed below the cutout and projecting toward the inner diameter side. The inner-diameter-side seal cover 108 has a circular cutout at the bottom on the outer diameter side, and also has a circular projection 108a formed above the cutout and projecting toward the outer diameter side, and a counter bore 108d to accommodate a head 111b of a coupling bolt 111 is formed in the circular projection 108a. With a circular gasket 108e placed between the side faces of the projections 107a, 108a, the projection 107a of the outer-diameter-side seal cover 107 is aligned in position with the cutout in the inner-diameter-side seal cover and then the coupling bolt 111 is guided from above through a through hole 108b provided in the projection 108a and through hole in the gasket 108e to cause a male thread 111a of the coupling bolt 111 to be screwed to a female thread 107c of the projection 107a, so that the inner-diameter-side seal cover 108 is fixed to the outer-diameter-side seal cover 107 as a result.

The outer-diameter-side seal cover 107 is fixed to the axial-direction seal cover 106 by fastening a bolt (not illustrated). The outer-diameter-side seal cover 107 and axial-direction seal cover 106 are sealed by a gasket 107d.

A setscrew 113 screwed with the female thread of a circular sleeve 113a fitting to a sleeve 112, so that the tip of the setscrew 113 abuts the outer periphery surface of the rotating shaft 101 and the sleeve 112 does not rotate but remains fixed. The circular sleeve 113a is restrained by a split ring 113c from moving outward in the axial direction. A sleeve collar 114 presses a packing 114a against the end face of the sleeve 112 to seal along the rotating shaft 101. The primary-side mechanical seal 120 comprises: a mating ring 121 which is closely fitted and fixed to the bottom of a circular projection 112a of the sleeve 112 and rotates with the rotating shaft 101; a fixed-side seal ring 123 that slidably contacts the mating ring 121; a retainer 124 that holds the seal ring 123 in place; a bellows 125 which is welded and fixed to the retainer 124 and adds bias force in the axial direction; and an adapter 126 whose one end is welded and fixed to the bellows 125 and other end is fixed by a bolt 127 to the inner periphery of the axial-direction seal cover 106.

It should be noted that the seal ring 123, retainer 124, bellows 125, and adapter 126 constitute a fixed-side seal assembly 122.

The secondary-side mechanical seal 130 comprises: a mating ring 131 which is closely fitted and fixed to the top of the circular projection 112a of the sleeve 112 and rotates with the rotating shaft 101; a fixed-side seal ring 133 that slidably contacts the mating ring 131; a retainer 134 that holds the seal ring 133 in place; a bellows 135 which is welded and fixed to the retainer 134 and adds bias force in the axial direction; and an adapter 136 whose one end is welded and fixed to the bellows 135 and other end is welded and fixed, along its outer periphery, to the inner periphery of the inner-diameter-side seal cover 108. It should be noted that the seal ring 133, retainer 134, bellows 135, and adapter 136 constitute a fixed-side seal assembly 132. In other words, the fixed-side seal assembly 132 is connected to the inner-diameter-side seal cover 108 in a securely following manner.

Also, external liquid 137 is sealed in an interim chamber B between the primary-side mechanical seal 120 and secondary-side mechanical seal 130, filling the chamber to its top. Provided downward of the axial-direction seal cover 106 is an inlet hole 106b (feed hole) which connects to the interim chamber B housing the primary-side mechanical seal 120 and through which the external liquid 137 flows in from the outside, while provided roughly at the center of the outer-diameter-side seal cover 107 in the vertical direction is an outlet hole 107b (feed hole) which connects to the interim chamber B housing the secondary-side mechanical seal 130 and through which the external liquid 137 flows out to the outside, and the external liquid 137 keeps the interim chamber B at a desired pressure. Also, the external liquid 137 is circulated by an impeller 112b provided on the sleeve 112.

Next, maintenance of the seal ring 133, etc., is explained.
(Step 1) As a preparation, a liquid or gas 103 in the pump chamber is drained and the external liquid 137 in the interim chamber B is drained from a drain port (not illustrated). With a set plate (not illustrated) engaging with a concave part 113b of the circular sleeve 113a, the set plate is installed to the outer-diameter-side seal cover 107 by a set plate bolt (not illustrated), after which the setscrew 113 and nut 110 are removed and the mechanical seal device 104 is removed from the equipment main body 102.

It should be noted that, by installing the set plate, the outer-diameter-side seal cover 107 is fixed to the sleeve 112 via the circular sleeve 113a and split ring 113c, and the primary-side mechanical seal 120 and secondary-side mechanical seal 130 can now be assembled into a cartridge structure having the same mode for use as that shown in FIG. 1.

(Step 2) The set plate bolt is loosened and the set plate is removed, and the split ring 113c and sleeve collar 114 are removed, as well.
(Step 3) The coupling bolt 111 is loosened and the outer-diameter-side seal cover 107 is removed from the inner-diameter-side seal cover 108. FIG. 3 shows the state after the seal cover has been removed.
(Step 4) Maintenance of the fixed-side seal assembly 132 is performed, such as repairing the seal ring 133.
(Step 5) The dismantling steps defined in Steps 1 to 4 above are performed in the reverse order to restore the original state.

Because the seal ring 133 is connected to the inner-diameter-side seal cover 108 (first seal cover) in a securely following manner, and also because the inner-diameter-side seal cover 108 (first seal cover) and outer-diameter-side seal cover 107 (first seal cover) are detachably connected in the axial direction by leaving the axial-direction seal cover (second seal cover) free from them, as described above, the assembly shown in FIG. 2 can be obtained by removing the seal ring 133, inner-diameter-side seal cover 108 (first seal cover) and outer-diameter-side seal cover 107 (first seal cover) from the axial-direction seal cover 106 (second seal cover), which allows for maintenance of the seal ring 133 on the connection piece which is lightweight and offers excellent ease of handling.

Furthermore, because the inner-diameter-side seal cover 108 is detachably fixed to the outer-diameter-side seal cover 107, the outer-diameter-side seal cover 107 can be removed from the assembly shown in FIG. 2 if a need arises to replace the fixed-side seal assembly 132, and since there is no need to replace the outer-diameter-side seal cover 107 and all that is needed is to replace the fixed-side seal assembly 132 and inner-diameter-side seal cover 108, excellent economy is achieved.

Additionally, because the outer-diameter-side seal cover 107 is detachably connected to the axial-direction seal cover 106, there are more options during maintenance because it is possible to remove the inner-diameter-side seal cover 108 after it has been removed from the axial-direction seal cover 106 together with the outer-diameter-side seal cover 107, or remove the inner-diameter-side seal cover 108 without removing the outer-diameter-side seal cover 107 from the axial-direction seal cover 106.

Also, the inner-diameter-side seal cover 108 has no feed hole for external liquid or other fluid and the outlet hole 107b is provided in the outer-diameter-side seal cover 107 extending to the top, which increases the degree of flexibility of placing the outlet hole 107b. When a longitudinal pump is used, the outlet hole 107b can be placed even higher to keep gas from collecting above the interim chamber B.

Furthermore, as another maintenance procedure, because a circular projection 108a of the inner-diameter-side seal cover 108 is provided above (on the atmosphere A side of) a circular projection 107a of the outer-diameter-side seal cover 107, the inner-diameter-side seal cover 108 and fixed-side seal assembly 132 can be removed simply by loosening the coupling bolt 111 without loosening the nut 110, or specifically with the outer-diameter-side seal cover 107 still fixed to the axial-direction seal cover 106.

The foregoing explained the examples of the present invention using the drawings; however, specific constitutions are not limited to these examples and other modifications and additions are also included in the scope of the present invention so long as they do not deviate from the main points of the present invention.

For example, the foregoing explained a fixed-side seal assembly having a seal ring, retainer, bellows, and adapter; however, any fixed-side seal assembly may be used so long as it has at least a seal ring. In other words, any fixed-side seal assembly may be used so long as a seal ring is connected to its inner-diameter-side seal cover.

In addition, while desirably the outer-diameter-side seal cover 107 is made of stainless steel known for its excellent rigidity and corrosion resistance, the inner-diameter-side seal cover 108 can have relatively lower rigidity and therefore it suffices that this seal cover is constituted by a material offering excellent corrosion resistance, such as a resin molding or a metal other than stainless steel with corrosion-resistant coating applied to it.

Also, while the foregoing explained mechanical seal devices of the tandem type and double type, other types of mechanical seal devices are also supported.

DESCRIPTION OF THE SYMBOLS

101 Rotating shaft
102 Equipment main body
104 Mechanical seal device
105 Seal cover
106 Axial-direction seal cover (second seal cover)
106b Inlet hole (feed hole)
107 Outer-diameter-side seal cover (first seal cover)
107a Circular projection
107b Outlet hole (feed hole)
108 Inner-diameter-side seal cover (first seal cover)
108a Circular projection
111 Coupling bolt
111b Head
120 Primary-side mechanical seal
121 Mating ring
122 Fixed-side seal assembly
123 Seal ring
125 Bellows
130 Secondary-side mechanical seal
131 Mating ring
132 Fixed-side seal assembly
133 Seal ring
135 Bellows

What is claimed is:

1. A mechanical seal device comprising a seal cover fixed to a stationary body of an apparatus provided with a rotating shaft, a first mechanical seal having a first mating ring configured to rotate with the rotating shaft, as well as a first seal ring configured to slidably contact the first mating ring, and a second mechanical seal having a second mating ring configured to rotate with the rotating shaft, as well as a second seal ring configured to slidably contact the second mating ring, wherein the first mechanical seal and the second mechanical seal are configured in contact with a sealed fluid and an atmosphere, respectively, and are configured to seal the fluid between the rotating shaft and the seal cover;

the seal cover being a split structure comprising at least a first seal cover and a second seal cover detachably connected to each other in an axial direction, the first seal cover being a split structure comprising at least an outer-diameter-side seal cover and an inner-diameter-side seal cover, the inner-diameter-side seal cover being detachably connected to the outer-diameter-side seal cover from an outer side in the axial direction, the first seal ring being connected to the second seal cover, the second seal ring being connected to the inner-diameter-side seal cover in a securely following manner, the mechanical seal device further comprising a sleeve fixed to the rotating shaft and having a circular projection protruded in an outward radial direction, the circular projection having a first side part on a side of the sealed fluid and a second side part on the atmosphere side which are opposed to each other in an axial direction, and a backside part of the first mating ring and a backside part of the second mating ring being fixed to the first side part of the circular projection and the second side part of the circular projection, respectively.

2. A mechanical seal device according to claim 1, wherein the outer-diameter-side seal cover and the second seal cover are configured to partially define a space where the first and second seal rings are placed, and wherein an inlet hole and an outlet hole are provided in the second seal cover and the outer diameter-side seal cover, respectively, for feeding an external fluid from outside into the space.

3. A mechanical seal device according to claim 1, wherein the second seal ring is held by a retainer, the inner-side seal cover being fixed to an adapter by welding, the retainer being fixed to a first end of a bellows by welding, and a second end of the bellows being fixed to the adapter by welding.

4. A mechanical seal device according to claim 1, further comprising an impeller provided on a top of the circular projection of the sleeve and configured to circulate the external fluid in the space.

* * * * *